Dec. 2, 1947.  R. LINN  2,431,815
FLY TOOL FOR GENERATING SPHERICAL SURFACES
Filed March 17, 1945  2 Sheets-Sheet 1

INVENTOR.
Raymond Linn
BY
Carlson, Pitzner, Hubbard & Wolfe

Patented Dec. 2, 1947

2,431,815

UNITED STATES PATENT OFFICE 2,431,815

FLY TOOL FOR GENERATING SPHERICAL SURFACES

Raymond Linn, Detroit, Mich., assignor to Ex-Cell-O Corporation, Detroit, Mich., a corporation of Michigan Application March 17, 1945, Serial No. 583,321

5 Claims. (Cl. 29—103)

The present invention pertains to metal cutting tools, the general aim being to provide a novel fly tool for generating a spherical surface.

More particularly it is an object to provide such a tool which is adapted for use in an ordinary machine tool such as a boring machine, drill press or lathe without special adaptation or alteration of the machine.

Ruggedness and simplicity of construction are also objectives.

Further objects and advantages of the invention will become apparent as the following description proceeds, taken in connection with the accompanying drawings, in which.

Figure 3:
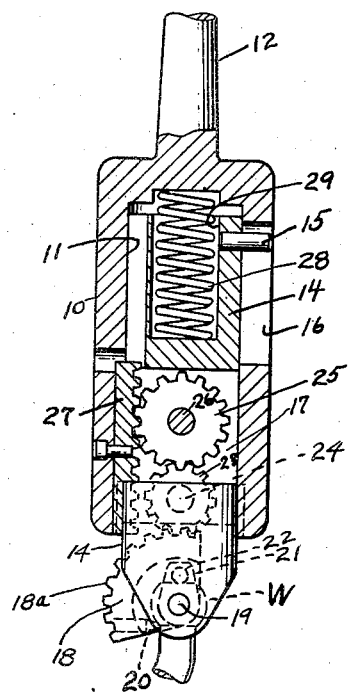
Figs. 2 and 3 are longitudinal sectional views of the tool of Fig. 1 showing the position of the same relative to the work and respectively the beginning and the end of the cutting operation.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the exemplary embodiment of the invention illustrated in the drawings, the particular tool there shown comprises a generally cylindrical housing 10 having an axially extending bore 11 therein opening from its lower end. Projecting axially from the opposite end is a shank 12 adapted to be secured in a suitable machine tool spindle (not shown) for bodily rotation of the tool structure as a whole about its longitudinal axis by the spindle.

Slidable axially within the housing bore 11 is a core or plug 14 of round cross section. This plug is restrained against rotation relative to the housing 10 by pin and slot connection with the latter, a pin 15 fixed in the plug 14 being positioned to project into a longitudinal slot 16 in the housing. Abutment of the pin against the ends of the slot also limits the axial travel of the plug relative to the housing.

Figure 2:
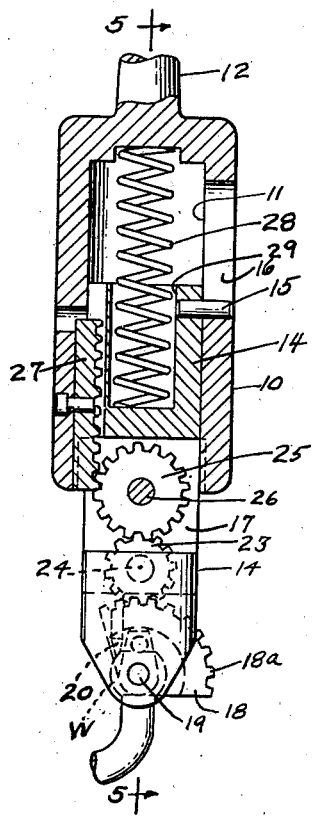
Figure 1:
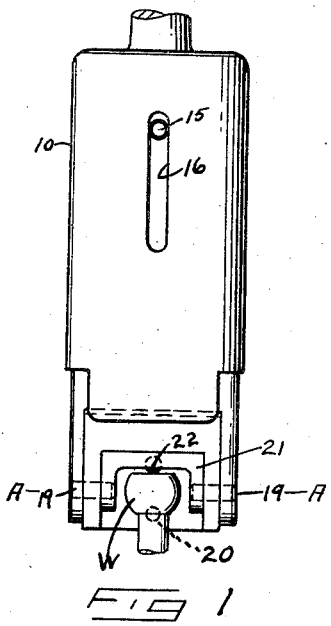
Figure 1 is a front elevation of a tool embodying the present invention, the tool being shown in position to operate upon the workpiece and a portion of the supporting shank for the tool being broken away.
Figure 4:
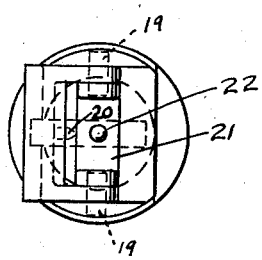
Fig. 4 is a bottom plan view of the tool shown in Fig. 1.
Figure 5:
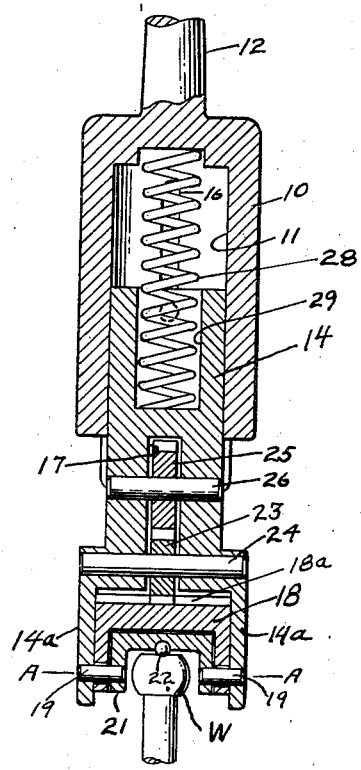
Fig. 5 is a sectional view taken substantially along the line 5—5 in Fig. 2.

The lower or outer end portion of the plug 14 is bifurcated, being slotted at 17 (Fig. 5). Moreover, the bifurcated outer end of the plug 14 is enlarged to provide a pair of spaced jaws or arms 14a between which is pivoted a yoke 18 carried by pivot pins 19 fixed to the arms 14a. Mounted on the yoke 18 and projecting inwardly therefrom is a cutter point 20 (Figs. 2, 3 and 4).

By causing the yoke 18 to pivot about the axis A—A passing through the pivot pins 19 while the tool structure as a whole is revolved about its longitudinal axis, the cutter point 20 is caused to generate a spherical contour on the workpiece W presented to it. Reaction of the workpiece W against the tool structure, as an incident to longitudinal feed of the latter toward the work, is utilized in imparting the desired pivotal or swinging motion to the yoke 18. For that purpose a bridge 21 (Fig. 5) is fixed to the inner ends of the pins 19 and carries a ball 22 adapted to seat in a centered recess in the end of the work. At the beginning of the cutting operation the tool structure is brought into the position of Fig. 2 where the ball 22 contacts the work, further axial movement of the plug 14 being prevented by such abutment so that in the course of subsequent forward axial feed of the housing 10 the latter slides downward over the plug 14 to the position of Fig. 3.

In order to utilize the relative axial movement of the housing 10 and plug 14 incident to abutment of the ball 22 against the work W for pivoting the yoke 18 about its axis A—A a suitable gearing is provided. Thus, in the illustrated construction, a toothed sector 18a, centered about the axis A—A is fashioned integrally with the yoke 18 exteriorly of the latter and arranged to mesh with a pinion 23 located in the slot 17 and journaled on a transverse pin 24. This pinion in turn meshes with a second pinion 25 also located in the slot 17 and journaled on a pin 26. The latter pinion 25 meshes with a rack 27 fixed to the interior of the housing 10. Consequently, as the plug 14 is shoved upward within the housing 10 from the position of Fig. 2 to that of Fig. 3 the pinion 25 rolls along the rack 27, thereby rotating the intermediate pinion 23 which in turn oscillates the yoke 18. A compression spring 28 partially housed within a bore 29 in the upper end of the plug 14 and interposed between the end wall of such bore and the end wall of the housing bore 11, yieldably urges the plug 14 to its outthrust position shown in Fig. 2.

The particular workpiece W illustrated is typical of the type of work which the disclosed tool is adapted to perform and is in this instance a portion of a steering knuckle such as is used in automobile steering systems. In shaping such a device it is requisite that it have machined on its end portions shown a surface contoured in the form of a portion of a sphere. The centering recess (not shown) in its outer end which receives the ball 22 is so located that the axis A—A on the tool will pass through the center of the portion of the workpiece on which it is desired to generate the spherical contour.

The operation of the disclosed tool will, in general, be clear from the foregoing. By way of brief recapitulation, it may be observed that the tool structure as a whole is shifted axially to approach the work until the ball 22 contacts the end of the work W as shown in Fig. 2. At the time of such contact, the plug 14 is outthrust from the housing by the spring 28 and the tool structure is rotating continuously about its longitudinal axis. While such rotation continues, axial feed of the housing 10 is continued at a slow rate. Any further axial movement of the plug 14 relative to the work is prevented by the abutment of the ball 22 against the work so that the plug is gradually forced axially into the housing 10 as the latter moves endwise toward the work. In the course of such entry of the plug 14 into the housing 10, the pinion 25 rolls along the rack 27 so that the yoke 18 is rocked about its axis A—A in timed relation with the axial feed of the housing 10. Moreover, the rotation of the housing 10 is normally effected in timed relation with its axial feed. The cutter point 29 thus rotates bodily about the longitudinal axis of the work and tool structure and at the same time is rocked through an arcuate path so that it generates a spherical surface on the work. At the completion of the machining operation it is necessary merely to back the tool holder axially away from the work in order to disengage the tool completely from the workpiece.

From the foregoing, it will be perceived that a single point or fly cutting tool has been provided which is adapted to generate a spherical surface on a workpiece rapidly and effectually. Since such a fly cutting tool has a small cutting contact with the work, only low stresses are set up. By rapid rotation of the tool the machining process may be rapidly accomplished in spite of the small cutting contact. The disclosed tool is especially effective in machining workpieces such as the steering knuckle shown which, because of their odd shape, make it difficult to rotate the work in contact with a form turning tool.

I claim as my invention:

1. A fly tool for generating external spherical surfaces comprising, in combination, a first member adapted to be fixed to a machine spindle or the like for rotation of the same, a second member slidable axially relative to the first and restrained against rotation with reference to the same, a cutter support carried by one of the said members for bodily rotation therewith and pivoted thereon to rock about an axis transverse to the axis of rotation of said member, said cutter support arranged to hold a cutter with its cutting edge projecting in a direction substantially toward the pivot of said support and means for rocking said support about its pivot in response to relative axial movement of said members.

2. A fly tool for generating external spherical surfaces comprising, in combination, a plug having a cutter support pivoted on one end thereof to swing about an axis extending transversely of the plug, said cutter support having a cutter point thereon projecting inwardly toward said axis and displaced from the latter, a generally tubular housing telescoped over said plug to slide axially with reference thereto, means restraining said plug and housing against relative rotation, means for fixing said housing to a machine tool spindle or the like for rotation of the housing about its longitudinal axis, and means operable in response to relative axial movement of said plug and housing for rocking said cutter support about its pivotal axis.

3. A fly tool for generating spherical surfaces comprising, in combination, a housing having a longitudinal bore opening from one end thereof, an axial shank projecting from the opposite end of said housing for supporting the same on a rotatable spindle or the like for bodily rotation about the axis of said housing, a plug slidable in said bore and restrained against rotation relative to said housing, a cutter point, a support for said point pivoted in the outer end of said plug to swing said point in an arcuate path lying in a plane paralleling the axis of said plug, a spring yieldably urging said plug outwardly of said bore, means on said plug engageable with a workpiece presented to its outer end for thrusting said plug inward of said bore as said housing is shifted axially toward the workpiece, and means including meshing toothed elements carried by said housing and plug for swinging said support about its pivot in timed relation with the axial movement of said plug relative to said housing.

4. A fly tool for generating spherical surfaces comprising, in combination, a housing having a longitudinal bore opening from one end thereof, an axial shank projecting from the opposite end of said housing for supporting the same on a rotatable spindle or the like for bodily rotation about the axis of said housing, a plug slidable in said bore and restrained against rotation relative to said housing, said plug having a bifurcated end portion projecting outwardly from said housing bore, a cutter point, a support for said point pivoted between the legs of the bifurcated end of said plug to swing about an axis transverse to the latter, a spring yieldably urging said plug outwardly of said bore, a bridge spanning the legs of said bifurcated ends of said plug and having means thereon engageable with a workpiece presented to its outer end for thrusting said plug inward of said bore as said housing is advanced axially with respect to the workpiece, a toothed sector rigid with said pivoted support, and means including a pinion journaled on said plug and meshing with said sector for swinging said support about its pivot in timed relation with the axial movement of said plug relative to said housing.

5. A fly tool for generating spherical surfaces comprising, in combination, a first member adapted to be fixed to a machine spindle or the like for rotation of the same, a second member slidable axially relative to the first and restrained against rotation with reference to the same, a cutter support carried by said second member for bodily rotation therewith and pivoted thereon to rock about an axis transverse to the axis of rotation of said member, means on said second member engageable with a workpiece presented thereto to cause axial movement of said second member inwardly with respect to said first member after engagement of such means with the workpiece, and means for rocking said support about its pivot in response to relative axial movement of said members ensuing after engagement of said first named means by the workpiece.

RAYMOND LINN.

REFERENCES CITED

The following references are of record in the file of this patent:

UNITED STATES PATENTS

| Number | Name | Date |
|---|---|---|
| 1,121,326 | Conner | Dec. 15, 1914 |
| 1,435,453 | Davis et al. | Nov. 14, 1922 |
| 1,834,716 | Kis | Dec. 1, 1931 |

FOREIGN PATENTS

| Number | Country | Date |
|---|---|---|
| 242,953 | Great Britain | Aug. 25, 1925 |
| 645,307 | Germany | May 25, 1937 |